(12) United States Patent
Abusleme et al.

(10) Patent No.: US 8,399,565 B2
(45) Date of Patent: Mar. 19, 2013

(54) THERMOPLASTIC HALOPOLYMER COMPOSITION

(75) Inventors: Julio A. Abusleme, Saronno (IT); Giulo Brinati, Milan (IT); Pier Antonio Guarda, Arese (IT)

(73) Assignee: Solvay Solexis S.p.A., Milan (IT)

( * ) Notice: Subject to any disclaimer, the term of this patent is extended or adjusted under 35 U.S.C. 154(b) by 253 days.

(21) Appl. No.: 11/995,374

(22) PCT Filed: Jun. 27, 2006

(86) PCT No.: PCT/EP2006/063589
§ 371 (c)(1),
(2), (4) Date: Aug. 19, 2008

(87) PCT Pub. No.: WO2007/006646
PCT Pub. Date: Jan. 18, 2007

(65) Prior Publication Data
US 2009/0171004 A1 Jul. 2, 2009

(30) Foreign Application Priority Data
Jul. 13, 2005 (EP) .................................. 05106413

(51) Int. Cl.
*C08F 214/26* (2006.01)
*C08L 27/16* (2006.01)

(52) U.S. Cl. ........ 525/200; 524/520; 524/544; 524/545; 524/546; 525/199

(58) Field of Classification Search .................. 525/199, 525/200; 524/520, 544, 545, 546
See application file for complete search history.

(56) References Cited

U.S. PATENT DOCUMENTS 3,624,250 A 11/1971 Carlson
3,639,237 A * 2/1972 Curtis ........................... 508/138
3,665,041 A 5/1972 Sianesi et al.
3,810,874 A 5/1974 Mitsch et al.
(Continued)

FOREIGN PATENT DOCUMENTS

| EP | 0185242 A2 | 6/1986 |
|---|---|---|
| EP | 0186215 A2 | 7/1986 |

(Continued)

OTHER PUBLICATIONS

Mark S.M. Alger, "Polymer Science Dictionary", London School of Polymer Technology, Polytechnic of North London, UK, published by Elsevier Applied Science, 1989, p. 476 (3 p.).

(Continued)

*Primary Examiner* — Nicole M Buie-Hatcher
(74) *Attorney, Agent, or Firm* — Arent Fox LLP

(57) ABSTRACT

The invention pertains to a thermoplastic fluoropolymer composition comprising: at least one thermoplastic partially fluorinated fluoropolymer having a melt flow index (MFI) of less than 10 g/10 min, as measured according to ASTM D-1238 under a piston load of 5 kg polymer A; from 0.05 to 5% by weight of A at least one (per)fluoropolyether, polymer B; and from 0 to 10% by weight of A of at least one per(halo) fluoropolymer polymer C. The addition of a (per)fluoropolyether B and, optionally, of a per(halo)fluoropolymer C advantageously enables improvement of rheological behavior of thermoplastic partially fluorinated fluoropolymer A, making possible processing in less severe conditions and yielding final parts with outstanding surface aspect and good homogeneity and coherency. Still objects of the inventions are the process for manufacturing said thermoplastic fluoropolymer composition and the articles thereof.

13 Claims, 1 Drawing Sheet

U.S. PATENT DOCUMENTS

| | | | |
|---|---|---|---|
| 3,847,978 A | 11/1974 | Sianesi et al. | |
| 4,016,345 A | 4/1977 | Holmes | |
| 4,094,911 A * | 6/1978 | Mitsch et al. | 568/615 |
| 4,380,618 A | 4/1983 | Khan et al. | |
| 4,423,192 A * | 12/1983 | Van Lang et al. | 525/199 |
| 4,513,129 A | 4/1985 | Nakagawa et al. | |
| 4,524,194 A | 6/1985 | Dumoulin | |
| 4,725,644 A | 2/1988 | Malhotra | |
| 4,739,024 A | 4/1988 | Moggi et al. | |
| 4,864,006 A * | 9/1989 | Giannetti et al. | 526/209 |
| 4,904,726 A * | 2/1990 | Morgan et al. | 524/520 |
| 4,952,630 A * | 8/1990 | Morgan et al. | 525/72 |
| 5,021,516 A | 6/1991 | Wheland | |
| 5,093,400 A * | 3/1992 | Arcella et al. | 524/366 |
| 5,182,342 A | 1/1993 | Feiring et al. | |
| 5,208,293 A * | 5/1993 | Oki et al. | 525/199 |
| 5,223,343 A | 6/1993 | Tannenbaum | |
| 5,266,639 A * | 11/1993 | Chapman et al. | 525/200 |
| 5,434,229 A | 7/1995 | Abusleme et al. | |
| 5,444,116 A * | 8/1995 | Amin et al. | 524/495 |
| 5,453,477 A | 9/1995 | Oxenrider et al. | |
| 5,461,107 A * | 10/1995 | Amin et al. | 524/495 |
| 5,510,435 A | 4/1996 | Abusleme et al. | |
| 5,569,728 A | 10/1996 | Abusleme et al. | |
| 5,597,880 A | 1/1997 | Abusleme et al. | |
| 6,271,294 B1 * | 8/2001 | Lasson et al. | 524/314 |
| 6,297,334 B1 | 10/2001 | Marchese et al. | |
| 6,310,141 B1 * | 10/2001 | Chen et al. | 525/199 |
| 6,479,591 B2 | 11/2002 | Kapeliouchko et al. | |
| 6,790,912 B2 * | 9/2004 | Blong | 525/197 |
| 2004/0054050 A1 * | 3/2004 | Pascal et al. | 524/306 |

FOREIGN PATENT DOCUMENTS

| | | |
|---|---|---|
| EP | 0222408 A2 | 5/1987 |
| EP | 0374803 A2 | 6/1990 |
| EP | 0526216 A2 | 2/1993 |
| EP | 0816397 A1 | 1/1996 |
| JP | 06-049438 A | 2/1994 |
| JP | 06049438 A * | 2/1996 |
| WO | WO03/050183 A1 | 6/2003 |
| WO | WO2006114411 A1 | 11/2006 |
| WO | WO2007006645 A1 | 1/2007 |

OTHER PUBLICATIONS

Unknown Author, ASTM Method D-1238.04c "Standard Test Method for Melt Flow Rates of Thermoplatics by Extrusion Plastometer", 2004 (14 pp.).

* cited by examiner

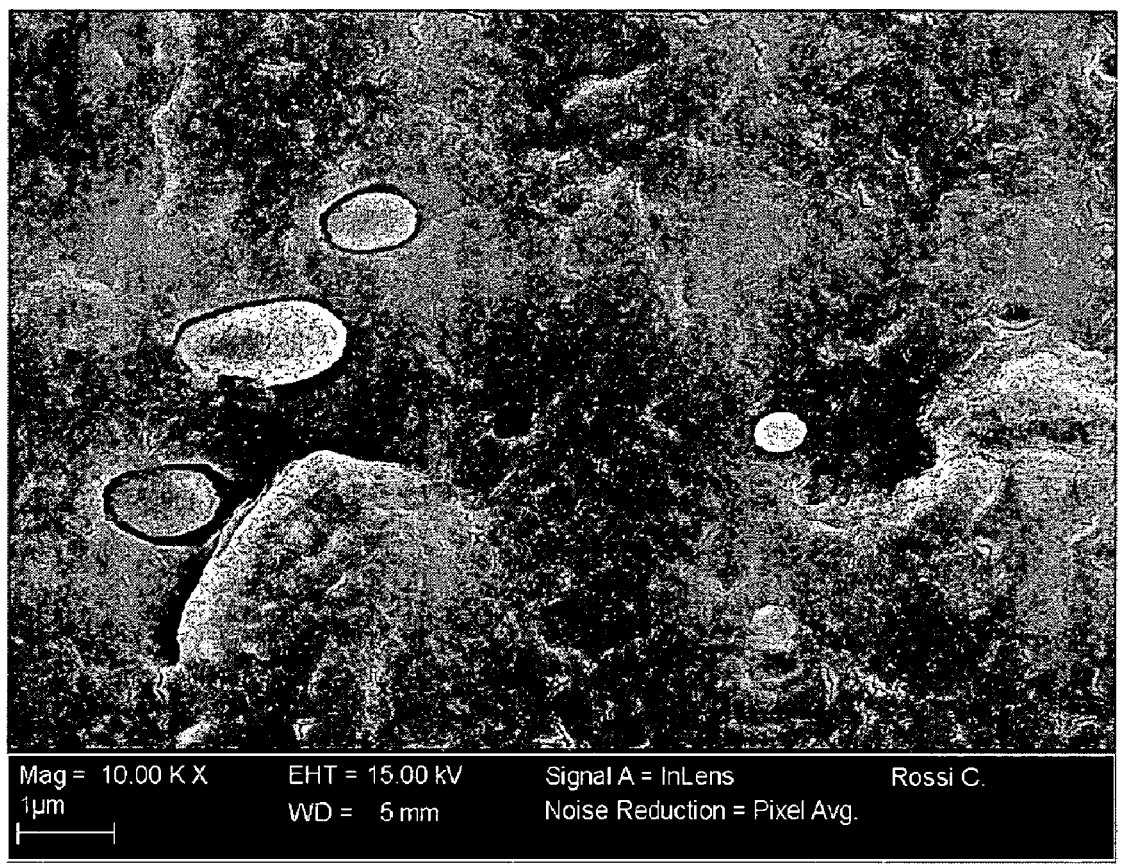

THERMOPLASTIC HALOPOLYMER COMPOSITION

CROSS-REFERENCE TO RELATED APPLICATIONS

This application is a National Stage entry of International Application No. PCT/EP06/63589, having an international filing date of Jun. 27, 2006; which claims priority to European Application No.: 05106413.7, filed Jul. 13, 2005, the disclosures of each of which is hereby incorporated in its entirety by reference.

The invention pertains to thermoplastic halopolymer compositions, to a process for manufacturing said thermoplastic halopolymer compositions and to the articles thereof.

Halopolymers, in particular fluorocarbon resins, are endowed with outstanding mechanical properties within a broad range of temperature, excellent resistance to high temperature, organic solvents and to various chemically aggressive environments.

Thanks to their properties they are commonly used for manufacturing articles by extrusion or injection molding, e.g. for producing pipes, tubes, fittings, films, coatings, cable sheathings, flexible pipes and the like.

To further improve mechanical properties of these polymers, it is well known to increase their molecular weight, or, in other words, to increase their melt viscosity. Thus, although halopolymers of high molar mass (and thus high melt viscosity) are preferable because of improved mechanical properties, processing these materials is more difficult. In particular, in extrusion process, they display rheology problems, accounting for increased energy consumption during extrusion and more severe extrusion conditions to be applied (with consequent risks of thermal degradation of the polymer). In this case, finished parts (extrusion or injection molded) made from these halopolymers have generally surface defects like cracks, shark-skin, fish-eyes and the like.

Processing aids have been thus largely used to obviate these problems; nevertheless, they have several drawbacks. Due to their limited thermal stability at processing temperature, benefits of their addition are lost and fumes are released during processing; thermal degradation residues generate in final parts structural color (bad yellow indexes), defects and voids that can be detrimental to mechanical properties. Moreover, due to their incompatibility with the halopolymer itself, they tend to segregate and yield uneven dispersion, so that the benefits in improving rheological behavior are lost.

This invention thus aims at providing a halopolymer composition with increased processability and yielding finished parts with outstanding surface aspect.

This problem is remarkably solved by the thermoplastic halopolymer composition of the invention, comprising:
  at least one thermoplastic halopolymer [polymer (A)];
  from 0.01 to 5% by weight of (A) of at least one (per) fluoropolyether [polymer (B)]; and
  from 0.3 to 10% by weight of (A) of at least per(halo) fluoropolymer [polymer (C)].

Another object of the invention is a process for manufacturing said thermoplastic halopolymer compositions.

Still objects of the invention are the articles, such as shaped articles, films, cable sheathing, pipes, flexible pipes, hollow bodies comprising the thermoplastic halopolymer composition.

The addition of a (per)fluoropolyether (B) and of a per (halo)fluoropolymer (C) enables substantial improvement of rheological behavior of thermoplastic halopolymer (A), making possible processing in less severe conditions and yielding final parts with outstanding surface aspect and good homogeneity and coherency.

Within the context of the present invention, the term "polymer" possesses its usual meaning, i.e. it denotes a material comprising recurring units and having a molecular weight exceeding 300.

Polymer (C) is preferably present in the composition in phase-separated domains mainly comprising (C) in a continuous phase mainly comprising polymer (A), at least 75% by volume of said domains having maximal dimension not exceeding 20 µm.

Maximal dimension of said domains does not exceed preferably 10 µm, more preferably 5 µm, even more preferably 1 µm.

The term "continuous phase mainly comprising (A)" is intended to denote a continuous phase comprising (A) as major component, i.e. comprising more than 50%, preferably more than 60%, still more preferably more than 75% by weight of (A).

The term "phase-separated domains mainly comprising (C)" is intended to denote a phase comprising (C) as major component, i.e. comprising more than 50%, preferably more than 60%, still more preferably more than 75% by weight of (C).

The term "phase-separated domain" is intended to denote three-dimensional volume element of the composition of the invention, wherein the concentration of (C) is at least 25% higher, preferably 30% higher, still more preferably 50% higher than the concentration of (C) in the continuous phase mainly comprising (A).

The term "maximal dimension" is intended to denote the maximal value of the diameter of a cross-sectional area, associated to each of the possible differently oriented cross-sections of the phase-separated domain.

A cross section is to be intended as the intersection of the phase-separated domain in three-dimensional space with a plane. From a practical point of view, when cutting into slices, many parallel cross sections are obtained.

The diameter of a cross-sectional area is defined as the diameter of the smallest circle which the cross-sectional area can be comprised in.

Maximal dimension of the phase-separated domains may be preferably determined by SEM microscopy and image recognition on samples of the composition, obtained from microtomic cuts or fractures, realized at liquid nitrogen temperature.

Volume percent of phase-separated domains having maximal dimension not exceeding a relevant value is calculated by measuring surface area of such domains with respect to the total area of domains in the microtomic cut or fracture analyzed by SEM microscopy and image recognition.

The mention "at least one thermoplastic halopolymer (A)" is intended to denote one or more than one polymer (A).

The polymer (A) of the invention should be thermoplastic.

The term "thermoplastic" is understood to mean, for the purposes of the present invention, polymers existing, at room temperature, below their glass transition temperature, if they are amorphous, or below their melting point if they are semi-crystalline, and which are linear (i.e. not reticulated). These polymers have the property of becoming soft when they are heated and of becoming rigid again when they are cooled, without there being an appreciable chemical change. Such a definition may be found, for example, in the encyclopedia called "Polymer Science Dictionary", Mark S. M. Alger, London School of Polymer Technology, Polytechnic of North London, UK, published by Elsevier Applied Science, 1989.

Thermoplastic polymers are thus distinguishable from elastomers.

To the purpose of the invention, the term "elastomer" is intended to designate a true elastomer or a polymer resin serving as a base constituent for obtaining a true elastomer.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Polymer resins serving as a base constituent for obtaining true elastomers are in general amorphous products having a glass transition temperature ($T_g$) below room temperature. In most cases, these products correspond to copolymers having a $T_g$ below 0° C. and including reactive functional groups (optionally in the presence of additives) allowing the true elastomer to be formed.

Preferably, polymer (A) is semi-crystalline.

The term "semi-crystalline" is intended to denote a polymer having a heat of fusion of more than 1 J/g when measured by Differential Scanning Calorimetry (DSC) at a heating rate of 10° C./min, according to ASTM D 3418.

Preferably, the polymer (A) of the invention has a heat of fusion of at least 4 J/g, more preferably of at least 8 J/g.

To the purpose of the invention, the term "halopolymer" is intended to denote the homopolymers and copolymers obtained from monoethylenic monomers containing at least 2 carbon atoms and at least one halogen atom chosen from fluorine and chlorine. It is also intended to denote blends of homopolymers and copolymers. As examples of halopolymers that may be used in the present invention, mention may be made especially of vinylidene fluoride, vinyl fluoride, trifluoroethylene, chlorotrifluoroethylene, tetrafluoroethylene, hexafluoropropylene, vinyl chloride and vinylidene chloride homopolymers and copolymers, and also copolymers of one of these monomers with another non-halogenated monoethylenic monomer such as ethylene, vinyl acetate and acrylic or methacrylic monomers.

Preferably the halopolymer of the invention is a fluoropolymer, i.e. a polymer comprising recurring units derived from at least one ethylenically unsaturated monomer comprising at least one fluorine atom (hereinafter, fluorinated monomer).

More preferably, the halopolymer of the invention is a partially fluorinated fluoropolymer.

To the purpose of the present invention, the term "partially fluorinated fluoropolymer" is intended to denote any polymer comprising:
recurring units derived from at least one fluorinated monomer; and
recurring units derived from at least one ethylenically unsaturated monomer comprising at least one hydrogen atom (hereinafter, hydrogen-containing monomer).

The fluorinated monomer and the hydrogen-containing monomer may be the same monomer or may be different monomers.

The partially fluorinated fluoropolymer comprises advantageously more than 1% mol, preferably more than 5% mol, more preferably more than 10% mol of recurring units derived from the hydrogen-containing monomer.

The partially fluorinated fluoropolymer comprises advantageously more than 25% mol, preferably more than 30% mol, more preferably more than 40% mol of recurring units derived from the fluorinated monomer.

The fluorinated monomer can further comprise one or more other halogen atoms (Cl, Br, I). Should the fluorinated monomer be free of hydrogen atom, it is designated as per(halo)fluoromonomer. Should the fluorinated monomer comprise at least one hydrogen atoms, it is designated as hydrogen-containing fluorinated monomer.

Should the fluorinated monomer be a hydrogen-containing fluorinated monomer, such as for instance vinylidene fluoride, trifluoroethylene, vinylfluoride, the partially fluorinated fluoropolymer can be either a homopolymer comprising recurring units derived from said hydrogen-containing fluorinated monomer, or a copolymer comprising recurring units derived from said hydrogen-containing fluorinated monomer and from at least one other comonomer.

The comonomer can be either hydrogenated (i.e. free of fluorine atom) or fluorinated (i.e. containing at least one fluorine atom).

Should the fluorinated monomer be a per(halo)fluoromonomer, such as for instance tetrafluoroethylene, chlorotrifluoroethylene, hexafluoropropylene, perfluoroalkylvinylethers, the partially fluorinated fluoropolymer is a copolymer comprising recurring units derived from said per(halo)fluoromonomer and from at least one other comonomer, said comonomer comprising at least one hydrogen atom, such as for instance ethylene, propylene, vinylethers, acrylic monomers, vinylidene fluoride, trifluoroethylene, vinylfluoride.

Preferred partially fluorinated fluoropolymer are those wherein the fluorinated monomer is chosen from the group consisting of tetrafluoroethylene (TFE), vinylidene fluoride (VdF) and chlorotrifluoroethylene (CTFE).

Non limitative examples of suitable hydrogenated comonomers are notably ethylene, propylene, vinyl monomers such as vinyl acetate, acrylic monomers, like methyl methacrylate, butyl acrylate, acrylic acid, methacrylic acid and hydroxyethyl acrylate, as well as styrene monomers, like styrene and p-methylstyrene.

Non limitative examples of suitable fluorinated comonomers are notably:
$C_3$-$C_8$ perfluoroolefins, such as hexafluoropropene;
$C_2$-$C_8$ hydrogenated monofluoroolefins, such as vinyl fluoride;
1,2-difluoroethylene and trifluoroethylene;
perfluoroalkylethylenes complying with formula $CH_2=CH-R_{f0}$, in which $R_{f0}$ is a $C_1$-$C_6$ perfluoroalkyl;
chloro- and/or bromo- and/or iodo-$C_2$-$C_6$ fluoroolefins, like chlorotrifluoroethylene;
(per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;
$CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;
(per)fluoroalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like $-C_2F_5-O-CF_3$;
functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;
fluorodioxoles, especially perfluorodioxoles.

The melt index of the polymer (A) is preferably less than 10, preferably less than 8, more preferably less than 7 g/10 min, even more preferably less than 5 g/10 min, most preferably less than 2.5 g/10 min.

The melt flow index of the polymer (A) is advantageously measured according to ASTM D-1238 standard under a piston load of 5 kg at a temperature chosen as a function of the chemical nature of polymer (A), as detailed in paragraph 8.2 of said standard.

When the MFI of polymer (A) is of 10 g/10 min or more, the thermoplastic composition does not possess the outstanding mechanical properties which are sought for highly demanding applications.

More preferably, the partially fluorinated fluoropolymer are chosen among:

(A-1) TFE and/or CTFE copolymers with ethylene, propylene or isobutylene (preferably ethylene), with a molar ratio per(halo)fluoromonomer(s)/hydrogenated comonomer(s) of from 30:70 to 70:30, optionally containing one or more comonomers in amounts of from 0.1 to 30% by moles, based on the total amount of TFE and/or CTFE and hydrogenated comonomer(s) (see for instance U.S. Pat. Nos. 3,624,250 and 4,513,129);

(A-2) Vinylidene fluoride (VdF) polymers, optionally comprising reduced amounts, generally comprised between 0.1 and 15% by moles, of one or more fluorinated comonomer(s) (see for instance U.S. Pat. Nos. 4,524,194 and 4,739,024), and optionally further comprising one or more fluorinated or hydrogenated comonomer(s).

The CTFE or TFE copolymers (A-1) preferably comprise:
(a) from 35 to 65%, preferably from 45 to 55%, more preferably from 48 to 52% by moles of ethylene (E);
(b) from 65 to 35%, preferably from 55 to 45%, more preferably from 52 to 48% by moles of chlorotrifluoroethylene (CTFE) (for the ECTFE copolymers, hereinafter) and/or tetrafluoroethylene (TFE) (for the ETFE copolymers, herein after); and optionally
(c) from 0.1 to 30%, by moles, preferably 0.1 to 10% by moles, more preferably 0.1 to 5% by moles, based on the total amount of monomers (a) and (b), of one or more fluorinated comonomer(s) (c1) and/or hydrogenated comonomer(s) (c2).

Among fluorinated comonomers (c1) we can for example mention (per)fluoroalkylvinylethers, perfluoroalkylethylenes (such as perfluorobutylethylene), (per)fluorodioxoles as described in U.S. Pat. No. 5,597,880), vinylidenefluoride (VdF). Among them, preferred (c1) comonomer is perfluoropropylvinylether of formula $CF_2=CFO-C_3F_7$.

As non limitative examples of hydrogenated comonomers (c2), mention may be notably made of those having the general formula:

$$CH_2=CH-(CH_2)_nR_1 \quad (I)$$

wherein $R_1=OR_2$, or $-(O)_tCO(O)_pR_2$ wherein t and p are integers equal to 0, 1 and $R_2$ is a $C_1$-$C_{20}$ hydrogenated radical, of alkyl type, linear or branched when possible, or cycloalkyl, optionally containing heteroatoms and/or chlorine atoms, the heteroatoms preferably being O or N, $R_2$ optionally contains one or more functional groups, preferably selected from —OH, —COOH, epoxide, ester and ether, $R_2$ optionally contains double bonds, or $R_2$ is H, n is an integer in the range 0-10. Preferably $R_2$ is hydrogen or of alkyl type from 1 to 10 carbon atoms containing functional groups of hydroxide type, n is an integer in the range 0-5.

The preferred hydrogenated comonomers (c2) are selected from the following classes:
1) Acrylic monomers having the general formula:

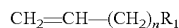
$$CH_2=CH-CO-O-R_2$$

wherein $R_2$ has the above mentioned meaning.

As non limitative examples of suitable acrylic monomers, mention can be notably made of ethylacrylate, n-butylacrylate, acrylic acid, hydroxyethylacrylate, hydroxypropylacrylate, (hydroxy)ethylhexylacrylate.

2) Vinylether monomers having the general formula:

$$CH_2=CH-O-R_2$$

wherein $R_2$ has the above mentioned meaning.

As non limitative examples of suitable vinylether monomers, mention can be notably made of propylvinylether, cyclohexylvinylether, vinyl-4-hydroxybutylether.

3) Vinyl monomers of the carboxylic acid having the general formula:

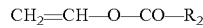
$$CH_2=CH-O-CO-R_2$$

wherein $R_2$ has the above mentioned meaning.

As non limitative examples of suitable vinyl monomers of the carboxylic acid, mention can be notably made of vinyl-acetate, vinylpropionate, vinyl-2-ethylhexanoate.

4) Unsaturated carboxylic acid monomers having the general formula:

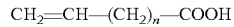
$$CH_2=CH-(CH_2)_n-COOH$$

wherein n has the above mentioned meaning. As non limitative example of suitable unsaturated carboxylic acid monomer, mention can be notably made of vinylacetic acid.

More preferred comonomer (c2) is n-butylacrylate.

Among A-1 polymers, ECTFE polymers are preferred.

The melt index of the ECTFE is advantageously at least 0.01, preferably at least 0.05, more preferably at least 0.1 g/10 min.

The melt index of the ECTFE is advantageously less than 10, preferably less than 7.5, more preferably less than 5 g/10 min, even more preferably less than 2.5 g/10 min.

The melt index of ECTFE is measured in accordance with modified ASTM test No. 1238, run at 275° C., under a piston load of 5 kg.

The ECTFE has a melting point advantageously of at least 150° C. and at most 265° C.

The melting point is determined by Differential Scanning Calorimetry (DSC) at a heating rate of 10° C./min, according to ASTM D 3418 Standard.

Particularly adapted to thermoplastic halogenated polymer composition of the invention is ECTFE available from Solvay Solexis Inc., Thorofare, N.J., USA, under the tradename HALAR® and VATAR®.

Most preferably, the partially fluorinated fluoropolymer is a VdF polymer (A-2).

The VdF polymers (A-2) preferably comprise:
(a') at least 60% by moles, preferably at least 75% by moles, more preferably at least 85% by moles of vinylidene fluoride (VdF);
(b') optionally from 0.1 to 15%, preferably from 0.1 to 12%, more preferably from 0.1 to 10% by moles of a fluorinated comonomer chosen among vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
(c') optionally from 0.1 to 5%, by moles, preferably 0.1 to 3% by moles, more preferably 0.1 to 1% by moles, based on the total amount of monomers (a') and (b'), of one or more fluorinated or hydrogenated comonomer(s).

As non limitative examples of the VdF polymers useful in the present invention, mention can be notably made of homopolymer of VdF, VdF/TFE copolymer, VdF/PMVE copolymer, VdF/TFE/HFP copolymer, VdF/TFE/CTFE copolymer, VdF/TFE/TrFE copolymer, VdF/CTFE copolymer, VdF/HFP copolymer, VdF/TFE/HFP/CTFE copolymer, VdF/TFE/perfluorobutenoic acid copolymer, VdF/TFE/maleic acid copolymer and the like.

The melt index of the VdF polymer is advantageously at least 0.01, preferably at least 0.05, more preferably at least 0.1 g/10 min.

The melt index of the VdF polymer is advantageously less than 10, preferably less than 7.5, more preferably less than 5 g/10 min, even more preferably less than 1 g/10 min.

The melt index of VdF polymer is measured in accordance with ASTM test No. 1238, run at 230° C., under a piston load of 5 kg.

The VdF polymer has a melting point advantageously of at least 120° C., preferably at least 125° C., more preferably at least 130° C.

The VdF polymer has a melting point advantageously of at most 190° C., preferably at most 185° C., more preferably at most 180° C.

The melting point ($T_{m2}$) is determined by DSC, at a heating rate of 10° C./min, according to ASTM D 3418.

According to a preferred embodiment of the invention, the polymer (A) is advantageously a mixture of at least one VdF homopolymer and at least one VdF copolymer chosen among the group consisting of VdF copolymer comprising from 0.1 to 15%, preferably from 0.1 to 12%, more preferably from 0.1 to 10% by moles of a fluorinated comonomer chosen among vinylfluoride ($VF_1$), chlorotrifluoroethylene (CTFE), hexafluoropropene (HFP), tetrafluoroethylene (TFE), trifluoroethylene (TrFE) and mixtures thereof.

Preferably, polymer (A) is a mixture of at least one VdF homopolymer and at least one VdF copolymer as above described, wherein the fluorinated comonomer is chosen among chlorotrifluoroethylene and hexafluoropropene.

The polymer (A) according to this preferred embodiment is more preferably a mixture comprising:
  advantageously from 25 to 75%, preferably from 25 to 65%, more preferably from 25 to 55% by weight of polymer (A) of at least one VdF homopolymer;
  advantageously from 25 to 75%, preferably from 35 to 75%, more preferably from 45 to 75% by weight of polymer (A) of at least one VdF copolymer as above described.

Within the context of the present invention, the term (per) fluoropolyether is intended to denote a polymer comprising recurring units (R1), said recurring units comprising at least one ether linkage in the main chain and at least one fluorine atom (fluoropolyoxyalkene chain).

Preferably the recurring units R1 of the (per)fluoropolyether are selected from the group consisting of:
(I) —CFX—O—, wherein X is —F or —$CF_3$; and
(II) —$CF_2$—CFX—O—, wherein X is —F or —$CF_3$; and
(III) —$CF_2$—$CF_2$—$CF_2$—O—; and
(IV) —$CF_2$—$CF_2$—$CF_2$—$CF_2$—O—; and
(V) —$(CF_2)_j$—CFZ-O— wherein j is an integer chosen from 0 and 1 and Z is a fluoropolyoxyalkene chain comprising from 1 to 10 recurring units chosen among the classes (I) to (IV) here above;
and mixtures thereof.

Should the (per)fluoropolyether comprise recurring units R1 of different types, advantageously said recurring units are randomly distributed along the fluoropolyoxyalkene chain.

Preferably the (per)fluoropolyether is a compound complying with formula (I) here below:

$$T_1\text{-}(CFX)_p\text{—O—}R_f\text{—}(CFX)_{p'}\text{-}T_2 \quad\quad (I)$$

wherein:
  each of X is independently F or $CF_3$;
  p and p', equal or different each other, are integers from 0 to 3;
  $R_f$ is a fluoropolyoxyalkene chain comprising repeating units R°, said repeating units being chosen among the group consisting of:
    (i) —CFXO—, wherein X is F or $CF_3$,
    (ii) —$CF_2$CFXO—, wherein X is F or $CF_3$,
    (iii) —$CF_2CF_2CF_2$O—,
    (iv) —$CF_2CF_2CF_2CF_2$O—,
    (v) —$(CF_2)_j$—CFZ-O— wherein j is an integer chosen from 0 and 1 and Z is a group of general formula —$OR'_f T_3$, wherein $R'_f$ is a fluoropolyoxyalkene chain comprising a number of repeating units from 0 to 10, said recurring units being chosen among the followings: —CFXO—, —$CF_2$CFXO—, —$CF_2CF_2CF_2$O—, —$CF_2CF_2CF_2CF_2$O—, with each of each of X being independently F or $CF_3$; and $T_3$ is a $C_1$-$C_3$ perfluoroalkyl group,
  and mixtures thereof;
  $T_1$ and $T_2$, the same or different each other, are H, halogen atoms, $C_1$-$C_{30}$ end-group optionally comprising heteroatoms chosen among O, S, N, and/or halogen atoms.

The weight average molecular mass of the (per)fluoropolyether is generally comprised between 400 and 100 000, preferably between 600 and 20 000.

Preferably, the $T_1$ and $T_2$ are selected from the group consisting of:
(j) —Y', wherein Y' is chain end chosen among —H, halogen, such as —F, —Cl, $C_1$-$C_3$ perhalogenated alkyl group, such as —$CF_3$, —$C_2F_5$, —$CF_2$Cl, —$CF_2CF_2$Cl;
(jj) —$E_r$-$A_q$-$Y''_k$, wherein k, r and q are integers, with q=0 or 1, r=0 or 1, and k between 1 and 4, preferably between 1 and 2, E denotes a functional linking group comprising at least one heteroatom chosen among O, S, N; A denotes a $C_1$-$C_{20}$ bivalent linking group; and Y'' denotes a functional end-group.

The functional group E may comprise an amide, ester, carboxylic, thiocarboxylic, ether, heteroaromatic, sulfide, amine, and/or imine group.

Non limitative examples of functional linking groups E are notably —CONR— (R=H, $C_1$-$C_{15}$ substituted or unsubstituted linear or cyclic aliphatic group, $C_1$-$C_{15}$ substituted or unsubstituted aromatic group); —COO—; —COS—; —CO—; an heteroatom such as —O—; —S—; —NR'— (R=H, $C_1$-$C_{15}$ substituted or unsubstituted linear or cyclic aliphatic group, $C_1$-$C_{15}$ substituted or unsubstituted aromatic group); a 5- or 6-membered aromatic heterocycle containing one or more heteroatoms chosen among N, O, S, the same or different each other, in particular triazines, such as

The bivalent $C_1$-$C_{20}$ linking group A is preferably selected from the following classes:
1) linear substituted or unsubstituted $C_1$-$C_{20}$ alkylenic chain, optionally containing heteroatoms in the alkylenic chain; preferably linear aliphatic group comprising moieties of formula —$(CH_2)_m$—, with m integer between 1 and 20, and optionally comprising amide, ester, ether, sulfide, imine groups and mixtures thereof;

2) (alkylene)cycloaliphatic $C_1$-$C_{20}$ groups or (alkylen)aromatic $C_1$-$C_{20}$ groups, optionally containing heteroatoms in the alkylenic chain or in the ring, and optionally comprising amide, ester, ether, sulfide, imine groups and mixtures thereof;

3) linear or branched polyalkylenoxy chains, comprising in particular repeating units selected from: —$CH_2CH_2O$—, —$CH_2CH(CH_3)O$—, —$(CH_2)_3O$—, —$(CH_2)_4O$—, optionally comprising amide, ester, ether, sulfide, imine groups and mixtures thereof.

Examples of suitable functional groups Y" are notably —OH, —SH, —OR', —SR', —$NH_2$, —NHR', —$NR'_2$, —COOH, —$SiR'_dQ_{3-d}$, —CN, —NCO,

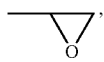

1,2- and 1,3-diols as such or as cyclic acetals and ketals (e.g., dioxolanes or dioxanes), —COR', —CH($OCH_3$)$_2$, —CH(OH)$CH_2OH$, —CH(COOR')$_2$, —CH(COOH)$_2$, —CH($CH_2OH$)$_2$, —CH($CH_2NH_2$)$_2$, —PO(OH)$_2$, —CH(CN)$_2$, wherein R' is an alkyl, cycloaliphatic or aromatic substituted or unsubstituted group, optionally comprising one or more fluorine atoms, Q is OR', R' having the same meaning as above defined, d is an integer between 0 and 3.

One or more functional end-groups Y" can be linked to the group A and/or E: for instance, when A is an (alkylen)aromatic $C_1$-$C_{20}$ group, it is possible that two or more Y" groups are linked to the aromatic ring of the group A.

More preferably, the (per)fluoropolyether of the invention complies with formula (I) here above, wherein the $T_1$ and $T_2$ are selected from the group consisting of: —H; halogen such as —F and —Cl; $C_1$-$C_3$ perhalogenated alkyl group, such as —$CF_3$, —$C_2F_5$, —$CF_2Cl$, —$CF_2CF_2Cl$; —$CH_2OH$; —$CH_2(OCH_2CH_2)_nOH$ (n being an integer between 1 and 3); —C(O)OH; —C(O)OCH$_3$; —ONH—$R_H$—OSi(OC$_2H_5$)$_3$ (where $R_H$ is a $C_1$-$C_{10}$ alkyl group); —CONHC$_{18}H_{37}$; —$CH_2OCH_2CH(OH)CH_2OH$; —$CH_2O$—$(CH_2CH_2O)_n$.PO(OH)$_2$ (with n* between 1 and 3);

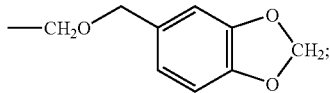

and mixtures thereof.

Most preferably, the (per)fluoropolyethers suitable for the invention are chosen among the group consisting of:

(a) HO—$CH_2CF_2O(CF_2O)_n(CF_2CF_2O)_mCF_2CH_2$—OH, m' and n' being integers, where the ratio m'/n' generally ranges between 0.1 and 10, preferably between 0.2 and 5;

(b) HO(CH$_2$CH$_2$O)$_n$CH$_2$CF$_2$O(CF$_2$O)$_n$(CF$_2$CF$_2$O)$_m$CF$_2$CH$_2$(OCH$_2$CH$_2$)$_n$OH, m' and n' being integers, where the ratio m'/n' generally ranges between 0.1 and 10, preferably between 0.2 and 5, and n ranges between 1 and 3;

(c) HCF$_2$O(CF$_2$O)$_n$(CF$_2$CF$_2$O)$_m$CF$_2$H, m' and n' being integers, where the ratio m'/n' generally ranges between 0.1 and 10, preferably between 0.2 and 5;

(d) FCF$_2$O(CF$_2$O)$_n$(CF$_2$CF$_2$O)$_m$CF$_2$F, m' and n' being integers, where the ratio m'/n' generally ranges between 0.1 and 10, preferably between 0.2 and 5.

Excellent results have been obtained with thermoplastic halopolymer compositions comprising a (per)fluoropolyether chosen among types (a) and (b) here above.

The (per)fluoropolyethers of the invention can be notably manufactured by photoinitiated oxidative polymerization (photooxidation reaction) of per(halo)fluoromonomers, as described in U.S. Pat. No. 3,665,041. Typically, (per)fluoropolyethers structures can be obtained by combination of hexafluoropropylene and/or tetrafluoroethylene with oxygen at low temperatures, in general below −40° C., under U.V. irradiation, at a wavelength (λ) of less than 3 000 Å. Subsequent conversion of end-groups as described in U.S. Pat. Nos. 3,847,978 and 3,810,874 is notably carried out on crude products from photooxidation reaction.

The (per)fluoropolyethers of types (a), (b), (c), and (d) as above described, are notably available from Solvay Solexis S.p.A. as FOMBLIN® ZDOL, FOMBLIN® ZDOL TX, H-GALDEN® and FOMBLIN® Z or FOMBLIN® M.

The amount of (per)fluoropolyether (B) in the multi-phase thermoplastic halopolymer composition as above described is of preferably at least 0.02%, more preferably at least 0.05% by weight of the thermoplastic halopolymer (A).

The amount of (per)fluoropolyether (B) in the multi-phase thermoplastic halopolymer composition as above described is of preferably at most 4%, more preferably at most 3% by weight of the thermoplastic halopolymer (A).

Good results have been obtained with composition comprising from 0.05 to 5% by weight of (A) of (per)fluoropolyether (B).

Excellent results have been obtained with composition comprising from 0.05 to 0.5% by weight of (A) of (per)fluoropolyether (B).

Thank to the presence of the (per)fluoropolyether (B), the composition comprising the thermoplastic halopolymer (A) can be advantageously processed at higher throughput rate and final parts so obtained possess excellent surface aspect, with no visual defects.

For the purpose of the invention, the term "per(halo)fluoropolymer" [polymer (C)] is intended to denote a fluoropolymer substantially free of hydrogen atoms.

The per(halo)fluoropolymer can further comprise one or more other halogen atoms (Cl, Br, I).

The term "substantially free of hydrogen atom" is understood to mean that the per(halo)fluoropolymer is prepared from ethylenically unsaturated monomers comprising at least one fluorine atom and free of hydrogen atoms (per(halo)fluoromonomer).

The per(halo)fluoropolymer can be a homopolymer of a per(halo)fluoromonomer or a copolymer comprising recurring units derived from more than one per(halo)fluoromonomers.

Non limitative examples of suitable per(halo)fluoromonomers are notably:

$C_2$-$C_8$ perfluoroolefins, such as tetrafluoroethylene and hexafluoropropene;

chloro- and/or bromo- and/or iodo-$C_2$-$C_6$ fluoroolefins, like chlorotrifluoroethylene;

per(halo)fluoroalkylvinylethers complying with general formula $CF_2$=$CFOR_{f3}$ in which $R_{f3}$ is a $C_1$-$C_6$ per(halo)fluoroalkyl, such as —$CF_3$, —$C_2F_5$, —$C_3F_7$;

$CF_2$=$CFOX_{01}$ per(halo)fluoro-oxyalkylvinylethers, in which $X_{01}$ is a $C_1$-$C_{12}$ per(halo)fluorooxyalkyl having one or more ether groups, like perfluoro-2-propoxypropyl group;

Per(halo)fluoroalkylvinylethers complying with general formula $CF_2$=$CFOCF_2ORf_4$ in which $R_{f4}$ is a $C_1$-$C_6$ or per(halo)fluoroalkyl, such as —$CF_3$, —$C_2F_5$, —$C_3F_7$ or a $C_1$-$C_6$ per(halo)fluorooxyalkyl having one or more ether groups, —$C_2F_5$—O—$CF_3$;

functional per(halo)fluoro-oxyalkylvinylethers complying with formula $CF_2$=$CFOY_{O1}$, in which $Y_{O1}$ is a $C_1$-$C_{12}$ per(halo)fluoroalkyl, or a $C_1$-$C_{12}$ per(halo)fluorooxyalkyl having one or more ether groups, and $Y_{O1}$ comprising a carboxylic or sulfonic acid group, in its acid, acid halide or salt form;

per(halo)fluorodioxoles.

Suitable examples of per(halo)fluoropolymer [polymer (C)] useful in the composition according to the invention are notably TFE homopolymers and copolymers and CTFE homopolymers and copolymers.

Preferred per(halo)fluoropolymer [polymer (C)] are notably TFE homopolymers and copolymers.

Should the polymer (C) be a TFE homopolymer, it is preferably a non fibrillating PTFE (commonly also referred to as "low molecular weight PTFE" or "low melt viscosity PTFE").

The non fibrillating PTFE has an average molecular weight in number of advantageously below 1 000 000, preferably below 700 000, more preferably below 500 000.

Besides, the non fibrillating PTFE has preferably an average molecular weight in number of preferably above 50 000.

The number average molecular weight of the non fibrillating is generally calculated by measuring the total amount $N_g$ (expressed in moles/kg) of the PTFE end groups —$CF_2COOH$ and —$CF_2COF$, determined by FT-IR spectroscopy. The number average molecular weight ($M_n$) is calculated by means of the following formula $M_n$=2 000/$N_g$.

The non fibrillating PTFE has preferably a melt viscosity of below $10^4$ Pa×s, as measured at 372° C. in accordance with the procedure ASTM D1239-52T, modified as described in U.S. Pat. No. 4,380,618.

The non fibrillating PTFE is preferably obtained by irradiating with gamma rays or electron beam powders of high molecular weight homopolymer of TFE (typically, with an average molecular weight in number above 2 000 000) obtained by dispersion or suspension polymerization processes and then milling said irradiated powders, or directly by polymerization technique such as described in example 1 of U.S. Pat. No. 5,223,343.

The non fibrillating PTFE is usually in the form of finely divided solids, and is then commonly referred to as "PTFE micropowder". The finely divided solids have an average particle size of preferably less than 100 μm, more preferably less than 20 μm, still more preferably less than 10 μm and the most preferably less than 5 μm.

With the dispersion polymerization processes latexes having a particle size of 0.1-0.3 micron are generally obtained. After coagulation the powder particle sizes increase usually to about 100-500 micron. Said powders are then in general irradiated with gamma rays and then milled to obtain finely divided solids as above specified.

With the suspension polymerization processes, powders having particle sizes of 2-5 mm are generally obtained. Said powders are in general irradiated with electron beam and then milled to obtain finely divided solids as above specified.

The non fibrillating PTFE has preferably thermal stability, chemical inertness, lubricity, and high melting temperature similar to high molecular weight PTFEs.

Especially suitable non fibrillating PTFE are ALGOFLON® L 206 and L 203 PTFE and POLYMIST® PTFE, available from Solvay Solexis, S.p.A. Other suitable non fibrillating PTFEs are commercially available notably from DuPont as ZONYL® PTFE (e.g. ZONYL® MP1600 grade), and from Daikin Industries, Ltd. as LUBLON® (e.g. LUBLON® L-5 PTFE).

Should the polymer (C) be a TFE copolymer, it comprises advantageously at least 2% wt, preferably at least 7% wt, and advantageously at most 30% wt, preferably at most 20% wt, more preferably at most 13% wt of recurring units derived from at least one fluorinated comonomer chosen among the group consisting of:

(i) perfluoroalkylvinylethers complying with formula $CF_2$=$CFOR_{f1'}$, in which $R_{f1'}$ is a $C_1$-$C_6$ perfluoroalkyl, e.g. $CF_3$, $C_2F_5$, $C_3F_7$; and/or (ii) perfluoro-oxyalkylvinylethers complying with formula $CF_2$=$CFOX_0$, in which $X_0$ is a $C_1$-$C_{12}$ perfluorooxyalkyl having one or more ether groups, like perfluoro-2-propoxy-propyl; and/or (iii) $C_3$-$C_8$ perfluoroolefins, such as hexafluoropropylene.

Good results have been obtained with TFE copolymers wherein the fluorinated comonomer is a $C_3$-$C_8$ perfluoroolefin and/or a perfluoroalkylvinylether as above specified; particularly good results have been achieved with TFE copolymers wherein the fluorinated comonomer is hexafluoropropylene and/or perfluoromethylvinylether (PMVE) (of formula $CF_2$=$CFOCF_3$).

Shall the polymer (C) be a TFE copolymer wherein the fluorinated comonomer is a perfluoroalkylvinylether as above specified, said TFE copolymer has a dynamic viscosity at a shear rate of 1 $s^{-1}$ of advantageously at most 100 Pa×sec, preferably of at most 50 Pa×sec, more preferably of at most 30 Pa×sec, most preferably of at most 10 Pa×sec at a temperature of 280° C.

Dynamic viscosity is typically measured with a controlled strain rheometer, employing an actuator to apply a deforming strain to the sample and a separate transducer to measure the resultant stress developed within the sample, using the parallel plate fixture.

According to an embodiment of the invention, the polymer (C) is preferably a tetrafluoroethylene (TFE)/perfluoromethylvinylether (PMVE) copolymer consisting essentially of:

from 4 to 25% moles, preferably from 5 to 20% wt, most preferably from 10 to 16% moles of recurring units derived from PMVE; and from 96 to 75% moles, preferably from 95 to 80, most preferably from 90 to 84% moles of recurring units derived from TFE.

Preferably the polymer (C) is melt-processible.

For the purposes of the present invention, by the term "melt-processible" is meant that the per(halo)fluoropolymer (C) can be processed (i.e. fabricated into shaped articles such as films, fibers, tubes, wire coatings and the like) by conventional melt extruding, injecting or casting means. Such typically requires that the dynamic viscosity at a shear rate of 1 $s^{-1}$ and at a temperature exceeding melting point of roughly 30° C., preferably at a temperature of $T_{m2}$+(30±2° C.), is of less than $10^6$ Pa×s, when measured with a controlled strain rheometer, employing an actuator to apply a deforming strain to the sample and a separate transducer to measure the resultant stress developed within the sample, and using the parallel plate fixture.

The melting point ($T_{m2}$) is determined by DSC, at a heating rate of 10° C./min, according to ASTM D 3418.

The melt processible per(halo)fluoropolymer (C) has a dynamic viscosity at a shear rate of 1 $s^{-1}$ in the above specified conditions preferably of less than 2 000 Pa×s, more preferably of less than 700 Pa×s.

Should the polymer (C) be melt-processible, the ratio between the melt index of the polymer (C) and the melt index of the polymer (A) is advantageously at least 5, preferably at least 10, more preferably at least 20.

The melt index of polymer (C) is measured in accordance with ASTM test No. 1238.

The amount of per(halo)fluoropolymer (C) in the thermoplastic halopolymer composition as above described is of advantageously at least 0.3%, preferably at least 1% by weight of the thermoplastic halopolymer (A). The amount of per(halo)fluoropolymer (C) in the thermoplastic halopolymer composition as above described is of advantageously at most 10%, preferably at most 5%, more preferably at most 4% by weight of the thermoplastic halopolymer (A).

Good results have been obtained with thermoplastic halopolymer composition comprising from 0.3 to 10% of per(halo)fluoropolymer (C) by weight of thermoplastic halopolymer (A). Best results have been achieved with thermoplastic fluoropolymer composition comprising from 1 to 3% of per(halo)fluoropolymer (C) by weight of thermoplastic halopolymer (A).

When a per(halo)fluoropolymer (C) is present in the composition comprising the thermoplastic halopolymer (A) and the (per)fluoropolyether (B), the processability of the composition is advantageously further improved. Thus, at comparable throughput in the extruder, composition further comprising the per(halo)fluoropolymer (C) can be extruded at lower head pressure than the composition free of polymer (C).

Optionally, the composition described above can further comprise pigments, filling materials, electrically conductive particles, mold release agents, heat stabilizer, anti-static agents, extenders, reinforcing agents, organic and/or inorganic pigments like $TiO_2$, carbon black, acid scavengers, such as MgO, flame-retardants, smoke-suppressing agents and the like.

By way of non-limiting examples of filling material, mention may be made of mica, alumina, talc, carbon black, glass fibers, carbon fibers, graphite in the form of fibers or of powder, carbonates such as calcium carbonate, macromolecular compounds and the like.

Pigments useful in the composition notably include, or will comprise, one or more of the following: titanium dioxide which is available form Whittaker, Clark & Daniels, South Plainfield, N.J., USA; Artic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepard Color Company, Cincinnati, Ohio, USA.; black F-2302, blue V-5200, turquoise F-5686, green F-5687, brown F-6109, buff F-6115, chestnut brown V-9186, and yellow V-9404 available from Ferro Corp., Cleveland, Ohio, USA and METEOR® pigments available from Englehard Industries, Edison, N.J., USA.

According to an embodiment of the invention, the composition further comprises a plasticizer.

Plasticizers suitable for the composition of the invention may be chosen from the usual monomeric or polymeric plasticizers for fluoropolymers.

Plasticizers described in U.S. Pat. No. 3,541,039 (PENNWALT CORP) 17 Nov. 1970 and those described in U.S. Pat. No. 4,584,215 (INST FRANCAIS DU PETROL (FR)) 22 Apr. 1986 are suitable for the compositions of the invention.

The plasticizers are incorporated without any difficulty in the compositions of the invention defined above and produce compositions whose impact strength, especially at low temperature, is advantageously improved. In other words, plasticizers can be advantageously used in the compositions of the invention to improve the low temperature behaviour of final parts made from inventive compositions, especially when these parts are submitted to extreme operating temperatures.

Among monomeric plasticizers, mention can be notably made of dibutyl sebacate (DBS), N-n-butylsulphonamide, acetyl-tri-n-butylcitrate of formula:

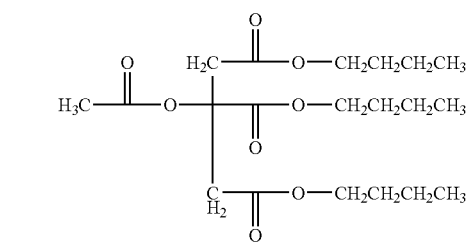

and dibutoxyethyladipate of formula:

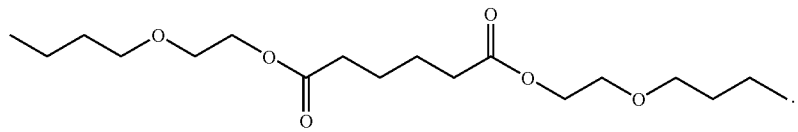 [SMILES: CCCCOCCOC(=O)CCCCC(=O)OCCOCCCC]

A plasticizer which has shown itself to be particularly advantageous within the context of the present invention is DBS ($C_4H_9$—OOC—$(CH_2)_8$—COO—$C_4H_9$).

Among polymeric plasticizers, mention can be notably made of polymeric polyesters such as those derived from adipic, azelaic or sebacic acids and diols, and their mixtures, but on condition that their molecular mass is at least approximately 1500, preferably at least 1800, and not exceeding approximately 5000, preferably lower than 2500. Polyesters of excessively high molecular mass result, in fact, in compositions of lower impact strength.

Should the composition of the invention comprise a plasticizer, the amount of plasticizer is of advantageously at least 1%, preferably of at least 2% and advantageously of at most 20%, preferably of at most 10% by weight of polymer (A).

Another aspect of the present invention concerns a process for manufacturing the thermoplastic halopolymer composition as above described, said process comprising mixing:
(i) the thermoplastic halopolymer (A);
(ii) the (per)fluoropolyether (B);
(iii) the per(halo)fluoropolymer (C); and
(iv) optionally, other additives or filling materials.

The process of the invention encompasses the simultaneous mixing of polymer (A), polymer (B) and polymer (C) or the mixing of two of said components in a first step, followed by mixing the so obtained admixture with the remaining component in a further step.

According to a preferred variant of the invention, the process comprises mixing by dry blending and/or melt compounding polymer (A), polymer (B) and polymer (C).

Preferably, the process comprises melt compounding polymer (A), polymer (B) and polymer (C).

Advantageously, the polymer (A), the polymer (B) and the polymer (C) are melt compounded in continuous or batch devices. Such devices are well-known to those skilled in the art.

Examples of suitable continuous devices to melt compound the thermoplastic halopolymer composition of the invention are notably screw extruders. Thus, the polymer (A), the polymer (B), the polymer (C) and optionally other ingredients, are advantageously fed in an extruder and the thermoplastic halopolymer composition is extruded.

This operating method can be applied either with a view to manufacturing finished product such as, for instance, hollow bodies, pipes, laminates, calendared articles, or with a view to having available granules containing the desired composition, optionally additives and fillers, in suitable proportions in the form of pellets, which facilitates a subsequent conversion into finished articles. With this latter aim, the thermoplastic halopolymer composition of the invention is advantageously extruded into strands and the strands are chopped into pellets.

Optionally, fillers, heat stabilizer, anti-static agents, extenders, reinforcing agents, organic and/or inorganic pigments like $TiO_2$, carbon black, acid scavengers, such as MgO, flame-retardants, smoke-suppressing agents, plasticizer(s) may be added to the composition during the compounding step.

Preferably, the polymer (A), the polymer (B) and the polymer (C) are melt compounded in a twin-screw extruder. Examples of suitable extruders well-adapted to the process of the invention are those available from Werner and Pfleiderer and from Farrel.

The process advantageously comprises mixing said polymer (C) under the form of particles having an average primary particle size of less than 300 nm, preferably less than 200 nm, even more preferably of less than 150 nm.

For the purpose of the invention the term "particle" is intended to denote a mass of material that, from a geometrical point of view, has a definite three-dimensional volume and shape, characterized by three dimensions, wherein none of said dimensions exceed the remaining two other dimensions of more than 200%. Particles are generally not equidimensional, i.e. that are longer in one direction than in others.

The shape of a particle can be notably expressed in terms of the sphericity $\Phi_s$, which is independent of particle size. The sphericity of a particle is the ratio of the surface-volume ratio of a sphere with equal volume as the particle and the surface-volume ratio of the particle. For a spherical particle of diameter $D_p$, $\Phi_s=1$; for a non-spherical particle, the sphericity is defined as $$\Phi_s = \frac{6 \cdot v_p}{D_p \cdot S_p}$$

wherein:
$D_p$ is the equivalent diameter of particle;
$S_p$ is the surface area of one particle;
$v_p$ is the volume of one particle.
The equivalent diameter is defined as the diameter of a sphere of equal volume. $D_p$ is usually taken to be the nominal size based on screen analysis or microscopic analysis. The surface area is found from adsorption measurements or from the pressure drop in a bed of particles.

The primary particles of polymer (C) of the invention have a sphericity $\Phi_s$ of advantageously at least 0.6, preferably at least 0.65, more preferably at least 0.7. Good results have been obtained with primary particles having a $\Phi_s$ from 0.7 to 0.95.

Primary particles of polymer (C) are generally obtained from emulsion polymerization and can be converted to agglomerates (i.e. collection of primary particles) in the recovery and conditioning steps of polymer (C) manufacture, like notably concentration and/or coagulation of polymer (C) latexes and subsequent drying and homogenization.

The term particles is thus to be intended distinguishable from pellets, which are obtained when extruding polymer (C) in the molten state into strands and chopping the strands into pellets.

Within the context of this invention, the term primary particle size is intended to denote the smallest size of particles of polymer (C) achieved during polymer (C) manufacture.

Should the polymer (C) not be submitted to conditions wherein agglomeration of primary particles occurs, then the average particles size of polymer (C) is equal to the average primary particles size.

On the contrary, should the polymer (C) submitted to conditions wherein agglomeration of primary particles takes place, then the average particle size of the polymer (C) is different (notably larger) from the average primary particle size.

The average primary particle size of the per(halo)fluoropolymer (C) can be advantageously measured by the dynamic laser light scattering (DLLS) technique according to the method described in B. Chu "Laser light scattering" Academic Press, New York (1974).

According to a first embodiment of the preferred variant of the invention, the process comprises mixing the polymer (A) and the polymer (C) under the form of latexes. Polymer (B) can be added in a further mixing step, or can be simultaneously admixed with (A) and (C).

The process according to the first embodiment of the preferred variant of the invention preferably comprises the following steps:
mixing a latex of polymer (A) with a latex of polymer (C), to obtain a latexes mixture;
coagulating said latexes mixture;
mixing said coagulated latexes mixture with the polymer (B) by dry blending and/or melt compounding.

Said latexes mixture can be advantageously coagulated by adding a coagulant. Suitable coagulants are those known in the coagulation of fluoropolymers latexes, for example aluminium sulfate, nitric acid, chlorhydric acid, calcium chloride. Calcium chloride is preferred. The amount of coagulants depends on the type of the used coagulant. Amounts in the range from 0.001% to 30% by weight with respect to the total amount of water in the latexes mixture, preferably in the range from 0.01% to 5% by weight, can be used.

The process according to the first embodiment of the preferred variant of the invention can further comprise a separation step for the recovery of the coagulated latexes mixture, and/or a drying step.

According to a second embodiment of the preferred variant of the invention, the process comprises mixing by synthesizing polymer (A) in the presence of polymer (C). Polymer (B) can be added in a further mixing step, or can be simultaneously admixed with (A) and (C).

The process according to the second embodiment of the preferred variant of the invention advantageously comprises the following steps:
introducing in the reaction medium the particles of polymer (C);

preparing in said reaction medium the polymer (A) to obtain a mixture of polymers (A) and (C);

mixing said mixture of polymers (A) and (C) with polymer (B) by dry blending and/or melt compounding.

The particles of polymer (C) may be introduced in the reaction medium under the form of dry particles, latex or dispersion.

Preferably the particles of polymer (C) are added under the form of latex.

Should the particles of polymer (C) be introduced under the form of latex, said latex can be advantageously coagulated by adding a coagulant in the reaction medium. The coagulants for the polymer (C) are those known in the coagulation of fluoropolymers latexes, for example aluminium sulfate, nitric acid, chlorhydric acid, calcium chloride. Calcium chloride is preferred. The amount of coagulants depends on the type of the used coagulant. Amounts in the range from 0.001% to 30% by weight with respect to the total amount of water in the reaction medium, preferably in the range from 0.01% to 5% by weight, can be used. The introduction of the polymer (C) at the beginning and/or during the polymer (A) synthesis is preferred.

The latex of polymer (C) can be obtained by emulsion (or microemulsion) polymerization (with the involvement of a water soluble initiator) or microsuspension polymerization (with the involvement of an oil soluble initiator). Processes comprising a microemulsion polymerization step as described in U.S. Pat. No. 6,297,334 are suitable for preparing primary particles having a mean diameter of below 100 nm.

The latex of polymer (C) is preferably obtained by any process comprising an emulsion or microemulsion polymerization step.

A detailed description of processes comprising an emulsion polymerization step of fluorinated monomers is available notably in U.S. Pat. Nos. 4,016,345, 4,725,644 and 6,479,591.

During emulsion and/or microemulsion polymerization for obtaining polymer (C), a mild stirring is advantageously applied to prevent the coagulation of the perfluoropolymer primary particles.

The polymer (C) polymerization step takes place advantageously in the presence of an emulsifier, preferably in a sufficiently high amount to stabilize the emulsion of the perfluoropolymer primary particles.

The emulsifier is preferably a fluorosurfactant. The fluorinated surfactants of formula:

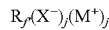

are the most commonly used, wherein $R_f$ is a (per)fluoroalkyl chain $C_5-C_{16}$ or a (per)fluoropolyoxyalkylene chain, $X^-$ is $-COO^-$ or $-SO_3^-$, $M^+$ is selected from $H^+$, $NH_4^+$, an alkaline metal ion and j can be 1 or 2. As non limitative example of fluorinated surfactants mention may be made of ammonium and/or sodium perfluorooctanoate, (per)fluoropolyoxyalkylenes having one or more carboxylic end groups.

More preferably, the fluorosurfactant is chosen from:

$CF_3(CF_2)_{n1}COOM'$, in which $n_1$ is an integer ranging from 4 to 10, preferably from 5 to 7, and more preferably being equal to 6; M' represents H, $NH_4$, Na, Li or K, preferably $NH_4$;

$T(C_3F_6O)_{n0}(CFXO)_{m0}CF_2COOM''$, in which T represents Cl or a perfluoroalkoxide group $C_kF_{2k+1}O$ with k=integer from 1 to 3, one F atom being optionally substituted by a Cl atom; $n_0$ is an integer ranging from 1 to 6; $m_0$ is an integer ranging from 0 to 6; M'' represents H, $NH_4$, Na, Li or K; X represents F or $CF_3$;

$F-(CF_2-CF_2)_{n2}-CH_2\ CH_2-SO_3M'''$, in which M''' represents H, $NH_4$, Na, Li or K, preferably H; $n_2$ is an integer ranging from 2 to 5, preferably $n_2=3$ $A-R_f-B$ bifunctional fluorinated surfactants, in which A and B, equal to or different from each other, are $-(O)_p$ $CFX-COOM^*$; $M^*$ represents H, $NH_4$, Na, Li or K, preferably $M^*$ represents $NH_4$; $X=F$ or $CF_3$; p is an integer equal to 0 or 1; $R_f$ is a linear or branched perfluoroalkyl chain, or a (per)fluoropolyether chain such that the number average molecular weight of $A-R_f-B$ is in the range 300-1,800.

A co-stabilizer is advantageously used in combination with the emulsifier. Paraffins with a softening point in the range 48° C.-62° C. are preferred as co-stabilizers.

The water-soluble initiator is advantageously chosen from persulphates, permanganates and hydrosoluble organic peroxides, such as disuccinic acid peroxide.

The water-soluble initiator can be optionally used in combination with a reducing agent. An example thereof is $(NH_4)_2Fe(SO_4)_2 \cdot 6H_2O$ (Mohr's salt).

The latex of the polymer (C) can be used directly as obtained from the emulsion polymerization for the preparation of the composition according to the invention. In this case, the latex has a solid content usually ranging from 20 to 30% wt.

Optionally, subsequent to the polymerization step, the latex of polymer (C) can be concentrated to increase the polymer (C) content up to at most 65% wt. The concentrated latex can be notably obtained with anyone of the processes known in the art. As an example, the concentrated latex can be notably obtained by the addition of a nonionic surfactant and by heating above the cloud point of the above-mentioned nonionic surfactant and separating the supernatant water phase from the polymer-rich phase. Otherwise, the concentrated latex can be obtained by an ultrafiltration method, well-known to those skilled in the art.

Optionally, the latex of polymer (C), either as obtained from the polymerization step, or after a concentrating step as described above, can be further purified from the residues of anionic fluorinated surfactants used for the emulsion polymerization. In this case, latex of polymer (C) substantially free of anionic fluorinated surfactants is advantageously obtained.

The step of preparing the thermoplastic halopolymer (A) is advantageously carried out according to known techniques, by copolymerization of the corresponding monomers, in suspension in organic medium or in aqueous emulsion, in the present of a suitable radical initiator, at a temperature comprised between −60° and 150° C., preferably between −20° C. and 100° C., more preferably between 0° and 80° C. The reaction pressure is comprised between 0.5 and 180 bar, preferably between 5 and 140 bar.

Shall the thermoplastic halopolymer be a copolymer, the addition of the comonomer(s) is carried out according to known techniques of the art; however a continuous or step by step addition of the comonomer(s) during the reaction is preferred.

Among the various radical initiators, it can be used in particular:

(i) bis-acylperoxides of formula $(R_f-CO-O)_2$, wherein $R_f$ is a (per)haloalkyl $C_1-C_{10}$ (see for instance EP 185 242 and U.S. Pat. No. 4,513,129), or a perfluoropolyoxyalkylene group (see for instance EP 186 215 and U.S. Pat. No. 5,021,516); among them, bis-trichloroacetylperoxide and bis-dichlorofluoro acetylperoxide are particularly preferred (see U.S. Pat. No. 5,569,728);

(ii) dialkylperoxides of formula (RH—O)$_2$, wherein RH is an alkyl $C_1$-$C_{10}$; diterbutylperoxide (DTBP) is particularly preferred;
(iii) water soluble inorganic peroxides, such as ammonium or alkaline metals persulphates or perphosphates; sodium and potassium persulphate is particularly preferred;
(iv) dialkylperoxydicarbonates, wherein the alkyl has from 1 to 8 carbon atoms, such as di-n-propyl-peroxydicarbonate and di-isopropyl-peroxydicarbonate (see EP 526,216);
(v) alkyl peroxyesters, like tert-amylperoxypivalate and tert-butylperoxyisobutirate;
(vi) organic or inorganic redox systems, such as ammonium persulphate/sodium sulphite, hydrogen peroxide/aminoiminomethansulphinic acid, terbutylhydroperoxide/metabisulphite (see U.S. Pat. No. 5,453,477).

In the case of the suspension copolymerization, the reaction medium is notably formed by an organic phase, to which water is usually added in order to favor the heat dispersion developing during the reaction. The organic phase can be formed by the monomer(s) themselves, without addition of solvents, or by the monomer(s) dissolved in a suitable organic solvent. As organic solvents chlorofluorocarbons are commonly used, such as $CCl_2F_2$ (CFC-12), $CCl_3F$ (CFC-11), $CCl_2F$—$CClF_2$, (CFC-113), $CClF_2$—$CClF_2$ (CFC-114), and the like.

Since such products have a destroying effect on the ozone present in the stratosphere, alternative products have been recently proposed, such as the compounds containing only carbon, fluorine, hydrogen and optionally oxygen, described in U.S. Pat. No. 5,182,342. In particular (per)fluoropolyethers with at least one hydrogenated end group, preferably two, such as —$CF_2H$, —$CF_2$—$CF_2H$, —$CF(CF_3)H$, can be used. A valid alternative is given by the hydrocarbons with branched chain described in U.S. Pat. No. 5,434,229, having from 6 to 25 carbon atoms and a ratio between methyl groups and carbon atom number higher than 0.5, such as for instance 2,3-dimethylbutane, 2,3-dimethylpentane, 2,2,4-trimethylpentane, 2,2,4,6,6-pentamethylheptane, 2,2,4,4,6-pentamethylheptane, etc, or mixtures thereof.

In the case of aqueous emulsion (co)polymerization, processes as described above for emulsion and microemulsion polymerization of polymer (C) are also advantageously applied for the preparation of polymer (A).

The control of molecular weight of the thermoplastic halopolymer (A) generally needs the use of telogen agents (chain transfer agents) in polymerization, owing to the fact that the used monomers generally do not show a telogen activity comparable to that of the known chain transfer agents.

When chain transfer agents are used, these can be for example hydrocarbons, alcohols, dialkylcarbonates, ketones, ethers, particularly methyl-tert-butylether, or halogenated hydrocarbons, having from 1 to 6 carbon atoms. Among them, chloroform, ethers, dialkylcarbonates and substituted alkyl cyclopentanes, such as methylcyclopentane are particularly preferred (see U.S. Pat. No. 5,510,435). The transfer agent is introduced into the reactor at the beginning of the reaction, or continuously or step by step during the polymerization. The amount of chain transfer agent can range within rather wide limits, depending on the polymerization conditions (reaction temperature, monomers, molecular weight required of the polymer, etc). In general such amount ranges from 0.01 to 30% by weight, preferably from 0.05 to 10% by weight, based on the total amount of monomers introduced in the reactor.

The thermoplastic halopolymer composition of the invention can be processed following standard methods for injection molding, extrusion, thermoforming, machining, and blow molding.

Still an object of the invention is an article comprising the thermoplastic halopolymer composition as above described or obtainable by the process as above described.

Advantageously the article is an injection molded article, an extrusion molded article, a machined article, a coated article or a casted article.

Non-limitative examples of articles are shaped article, pipes, fittings, housings, films, membranes, coatings.

Preferably the article is a pipe. Pipes according to the invention advantageously comprise at least one layer comprising the thermoplastic halopolymer composition.

Articles of the invention can advantageously find application in the oil and gas industry. Articles for oil field applications include shock tubing, encapsulated injection tubing, coated rod, coated control cables, down-hole cables, flexible flow lines and risers.

A particular example of articles of the invention is provided by reinforced flexible pipes, notably used in the oil industry for the transport of recovered fluids between installations at an oil field, and for the transport of process liquids between an installation positioned at the surface of the sea and an installation positioned below the surface of the sea. The reinforced flexible pipe of the invention typically comprises at least one layer comprising, preferably consisting essentially of the composition of the invention. It is also understood that the reinforced flexible pipe of the invention may comprise one or more that one layer comprising (preferably consisting essentially of) the composition of the invention.

A common type of the above-mentioned reinforced flexible pipes has generally a tight inner barrier layer comprising the composition of the invention, on whose inner side a collapse resistant layer, frequently called a carcass, is arranged, the purpose of which is to prevent the inner barrier layer from collapsing because of external pressure impacts.

One or more load-carrying reinforcement layers are arranged externally on the inner collapse resistant layer and the inner liner. These load-carrying reinforcement layers are sometimes also referred to as pressure reinforcement layers, tension reinforcement layers or cross reinforcement layers. These layers will be called hereinafter "the outer reinforcement layer". Generally, the outer reinforcement layer is composed of two layers arranged on top of each other, where the layer closest to the inner liner is of a nature such that it absorbs radial forces in the pipe (pressure reinforcement layer), while the overlying reinforcement layer primarily absorbs axial forces in the pipe (tension reinforcement layer). Finally, the outer reinforcement layer may have arranged externally thereon a tight jacket or external fluid barrier, which avoid the outer reinforcement layer to be freely exposed to the surroundings and which assure thermal insulation. Also, said external fluid barrier may comprise the composition of the invention.

Articles of the invention are also particularly suitable for the CPI market, that is to say for the so-called chemical process industry, wherein, typically:
corrosion-resistant linings comprising the composition of the invention can be applied by powder coating, sheet lining, extruded lining, rotational lining or other standard technique;
membranes comprising the composition of the invention can be made with varying degrees of porosity and manufacturing methods for use in water purification, foodstuffs dehydration, filtration of chemicals, and the like;

pipes, valves, pumps and fittings comprising the composition as above described can be used in chemical process equipment when excellent temperature and chemical resistance are required. Small pieces can economically be made entirely of the composition of the invention. Extruded or molded components include tubes, pipes, hose, column packing, pumps, valves, fittings, gaskets, and expansion joints.

Also, articles of the invention are advantageously suitable for building and architecture applications; in this domain, typically:

flexible corrugated ducts comprising the composition of the invention advantageously prevent corrosion from $SO_2$ and other products of combustion in residential chimney flues;

pipes and fittings comprising the composition of the invention advantageously provide for long life hot water service.

Moreover, articles of the invention can advantageously find application in the semiconductors industry, where the composition of the invention can, for instance, act as strong, tough, high purity material used routinely as structural materials in wet bench and wafer processing equipment. Moreover, the composition of the invention is suitable for construction of fire-safe wet benches and for windows, access panels, mini-environments, site glasses, and any other area within the cleanroom where transparency is needed.

The addition of a (per)fluoropolyether (B) and of a per (halo)fluoropolymer (C) advantageously enables improvement of rheological behavior of thermoplastic halopolymer (A), making possible processing in less severe conditions and yielding final parts with outstanding surface aspect and good homogeneity and coherency.

The process according to the invention is advantageously particularly efficient in assuring optimal distribution of the (per)fluoropolyether (B) and of the per(halo)fluoropolymer (C) in the thermoplastic halopolymer composition, which enables increased efficiency of polymers (B) and (C) as processing aids and avoids negative impact on mechanical properties.

Some examples of the present invention are reported hereinafter, whose purpose is merely illustrative but not limitative of the scope of the invention itself.

EXAMPLES

Analytical Methods
SEM Microscopy

SEM microscopy pictures have been taken using the electronic scanning microscope (SEM) model Stereoscan 200 by Cambridge Instruments at different magnification levels (from 32 to 10 000×) either on sample fractured at liquid nitrogen temperature, or on final shaped articles.

Dynamic Viscosity

Dynamic viscosity of the polymer is measured at a shear rate of $1\ s^{-1}$ and at a temperature exceeding of roughly 30° C. the melting point of said polymer with a Rheometric Scientific ARES controlled strain rheometer, employing an actuator to apply a deforming strain to the sample and a separate transducer to measure the resultant stress developed within the sample, and using the parallel plate fixture.

TFE/HFP Polymer Composition

The HFP content for the TFE/HFP copolymers is determined by measuring the IR absorbance at 982 $cm^{-1}$ ($A_{982\ cm^{-1}}$) and at 2367 $cm^{-1}$ ($A_{2367\ cm^{-1}}$) on a 50 µm-thick compression molded film. HFP content is calculated according to the following formula:

$$HFP_{(\%\ wt)} = \frac{A_{982\ cm^{-1}}}{A_{2367\ cm^{-1}}} \times 3.2$$

$$HFP_{(\%\ moles)} = \frac{(100 \times HFP_{(\%\ wt)})}{(150 - 0.5 \times HFP_{(\%\ wt)})} \times 3.2$$

Polymer Latex Particle Size

The average particle size of the polymer latex has been measured by the dynamic laser light scattering (DLLS) technique according to the method described in B. Chu "Laser light scattering" Academic Press, New York (1974), using a Brookhaven Scientific Instrument, composed by the BI9000 correlator and by the BI200SM goniometer. The used light source is an argon ion laser Spectra Physics (wave length 514.5 nm).

Differential Scanning Calorimetry

DSC measurements have been performed at a heating rate of 10° C./min, according to ASTM D 3418.

Comparative Example 1

Melt compounding and pipe extrusion of a composition of a thermoplastic fluoropolymer and a (per)fluoropolyether A blend comprising a mixture of SOLEF® 6015 and SOLEF® 31515 VdF polymers (67/33 wt/wt) and 0.1% by weight of a fluoropolyether complying with the following formula:

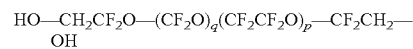
HO—$CH_2CF_2O$—$(CF_2O)_q(CF_2CF_2O)_p$—$CF_2CH_2$—OH whose main physico-chemical properties are listed here below:

| | | |
|---|---|---|
| $M_w$ (amu) | | 2000 |
| Difunctional content (NMR) (%) | | 94 |
| p/q ratio (NMR) | | ~1 |
| Kinematic viscosity (cSt) | | 85 |
| Density at 20° C. (g/cm³) | | 1.81 |
| Vapor pressure @ 100° C. (torr) | | $2 \times 10^{-5}$ |
| Surface tension @ 20° C. (dyne/cm) | | 24 | were mixed for 5 hours in a rotary blender and melt compounded in a Braebender conical twin-screw Hastelloy C-276 extruder having a final diameter of 18 mm. Temperature profile and extrusion parameters are detailed in Table 1.

TABLE 1

| | | |
|---|---|---|
| Zone 1 temperature (hopper) | (° C.) | 200 |
| Zone 2 temperature (barrel) | (° C.) | 210 |
| Zone 3 temperature (barrel) | (° C.) | 220 |
| Zone 4 temperature (head) | (° C.) | 230 |
| Torque | (Nm) | 36 |
| Pressure | (bar) | 67 |
| Melt temperature | (° C.) | 231 |
| Throughput rate | (kg/h) | 3.6 |
| Screw speed | (rpm) | 15 |

The composition was then extruded to manufacture pipes having an external diameter of 25 mm and a thickness of about 2-3 mm. Pipe extrusion was carried out in a single screw extruder with a diameter of 45 mm. The diameter of the die was 53.7 mm and the diameter of the tip was 43.6 mm. The temperature profile and extrusion parameters are reported in the following table 2 for two different screw speeds.

TABLE 2

| | | | |
|---|---|---|---|
| Zone 1 temperature (barrel) | (° C.) | 190 | 190 |
| Zone 2 temperature (barrel) | (° C.) | 200 | 200 |
| Zone 3 temperature (barrel) | (° C.) | 210 | 210 |
| Zone 4 temperature (barrel) | (° C.) | 210 | 210 |
| Zone 5 temperature (neck) | (° C.) | 215 | 215 |
| Zone 6 temperature (neck) | (° C.) | 210 | 210 |
| Zone 7 temperature (body) | (° C.) | 215 | 215 |
| Zone 8 temperature (die holder) | (° C.) | 210 | 210 |
| Zone 8 temperature (die) | (° C.) | 220 | 220 |
| Head pressure | (bar) | 28 | 35 |
| Melt temperature | (° C.) | 257 | 257 |
| Screw speed | (rpm) | 15 | 40 |
| Extruder consumption | (A) | 30 | 30 |
| Extruder Voltage | (V) | 51 | 51 |
| Output | Kg/h | 8.3 | 17.8 |

The extruded pipe has a smooth surface, with no visible crack and/or surface defect.

Mechanical properties were evaluated on specimens from the extruded pipe and measured according to ASTM D 638. Results are detailed in Table 3.

TABLE 3

| Thermoplastic fluoropolymer | (per)fluoropolyether (B) | | Elastic modulus | Stress at yield | Strain at yield | Stress at breack | Strain at breack |
|---|---|---|---|---|---|---|---|
| (A) | Nature | Amount | (MPa) | (MPa) | (%) | (MPa) | (%) |
| SOLEF ® 6015 PVDF + SOLEF ® 31515 PVDF (67/33 wt/wt) | See above | 0.1% by weight of (A) | 945 | 33.3 | 12.2 | 55.6 | 372 |

Comparative Example 2

Melt Compounding and Pipe Extrusion of a Composition of a Thermoplastic Fluoropolymer A blend of SOLEF® 6015 and SOLEF® 31515 VdF polymers (67/33 wt/wt) has been dry mixed for 5 hours in a rotary blender and melt compounded in a Braebender conical twin-screw extruder as described in comparative example 1.

The thus obtained blend has a MFI (230° C./10 kg) of 0.5 g/10 min.

The blend was then extruded to make tubes with an external diameter of 25 mm and a thickness of about 2-3 mm, as described in comparative example 1. Details of pipe extrusion parameters, at two different screw speeds, are detailed in Table 6.

TABLE 4

| | | | |
|---|---|---|---|
| Zone 1 temperature (barrel) | (° C.) | 190 | 190 |
| Zone 2 temperature (barrel) | (° C.) | 210 | 210 |
| Zone 3 temperature (barrel) | (° C.) | 210 | 210 |
| Zone 4 temperature (barrel) | (° C.) | 210 | 210 |
| Zone 5 temperature (neck) | (° C.) | 215 | 215 |
| Zone 6 temperature (neck) | (° C.) | 210 | 210 |
| Zone 7 temperature (body) | (° C.) | 215 | 215 |
| Zone 8 temperature (die holder) | (° C.) | 210 | 210 |
| Zone 8 temperature (die) | (° C.) | 220 | 220 |
| Head pressure | (bar) | 33 | 41 |
| Melt temperature | (° C.) | 254 | 256 |
| Screw speed | (rpm) | 15 | 25 |
| Extruder consumption | (A) | 34 | 38 |
| Extruder Voltage | (V) | 51 | 79 |

The pipes extruded in either condition had surface defects, like visible cracks on its surface.

Evaluation of mechanical properties on such extruded material was thus impossible.

Example 3

Example 3a

Preparation of a Melt-Processible Perfluoropolymer

A 5 l AISI 316 autoclave equipped with a stirrer working at 650 rpm was evacuated and there were introduced 3 l of demineralized water and 22.5 g of a microemulsion formed of:

20% by weight of GALDEN® D02, having the formula:

$$CF_3O-(CF_2CF(CF_3)O)_m(CF_2O)_n-CF_3$$

where m/n=20 and average molecular weight of 450;

40% by weight of a surfactant having the formula:

$$Cl-(C_3F_6O)-(CF_2CF(CF_3)O)_{m1}-(CF(CF_3)O)_q-(CF_2O)_{n1}-CF_2COO^-K^+$$

where $n_1$=0.8% $m_1$, q=9.2% $m_1$ and average molecular weight of 540;

the remaining part being formed by $H_2O$.

The autoclave was heated to the reaction temperature of 85° C. and HFP was then introduced to bring the total pressure in the vessel to 13.50 absolute bar. Then ethane was charged as chain transfer agent until the total pressure reached 13.60 absolute bar, and afterwards a TFE/HFP mixture containing 10% by moles of HFP was fed to obtain the reaction pressure of 21 absolute bar.

The polymerization was initiated by introducing 150 ml of a potassium persulfate (KPS) solution, obtained by dissolving 30 g KPS in 1 liter of demineralized water.

The reaction pressure was kept constant by feeding the monomer mixture TFE/HFP containing 10% by moles of HFP. At 60 and 120 minutes from the reaction start, 75 ml of KPS solution were fed. After 161 minutes of reaction, the polymerization was stopped, cooling the reactor to room temperature and releasing the residual pressure.

A latex containing 202 (g polymer)/(kg latex) was discharged (average primary particles size=125 nm) and coagulated with $HNO_3$, then the polymer was separated, washed with demineralized water and dried in an oven at 175° C. for about 16 hours.

The obtained powder has a dynamic viscosity of 210 Pa×s at 250° C. and at a shear rate of 1 $sec^{-1}$, a $T_{m2}$ of 220° C., a $\Delta H_{2f}$=18.9 J/g and is composed of 12% by moles of HFP and 88% by moles of TFE.

Example 3b

Melt Compounding and Pipe Extrusion of a Composition of a Thermoplastic Fluoropolymer, a (Per)Fluoropolyether and a Melt-Processible Perfluoropolymer A blend comprising a mixture of SOLEF® 6015 and SOLEF® 31515 VdF polymers (67/33 wt/wt), 0.1% of the (per)fluoropolyether of comparative example 1 and 1% by weight of the TFE/HFP copolymer of example 3a) were dry mixed for 5 hours in a rotary blender and melt compounded in a Braebender conical twin-screw Hastelloy C-276 extruder having a final diameter of 18 mm.

SOLEF® 6015 and SOLEF® 31515 VdF polymers are respectively a VdF homopolymer and a VdF/CTFE copolymer, commercially available from Solvay Solexis S.p.A.

Temperature profile and extrusion parameters are detailed in Table 5.

TABLE 5

| Zone 1 temperature (hopper) | (° C.) | 200 |
| Zone 2 temperature (barrel) | (° C.) | 210 |
| Zone 3 temperature (barrel) | (° C.) | 220 |
| Zone 4 temperature (head) | (° C.) | 230 |
| Torque | (Nm) | 45 |
| Pressure | (bar) | 96 |
| Melt temperature | (° C.) | 227 |
| Throughput rate | (kg/h) | 4 |
| Screw speed | (rpm) | 15 |

The composition was then extruded to manufacture pipes having an external diameter of 25 mm and a thickness of about 2-3 mm. They were extruded in a single screw extruder with a diameter of 45 mm. The diameter of the die was 53.7 mm and the diameter of the tip was 43.6 mm. The temperature profile and extrusion parameters are reported in the following Table 6.

TABLE 6

| Zone 1 temperature (barrel) | (° C.) | 190 |
| Zone 2 temperature (barrel) | (° C.) | 200 |
| Zone 3 temperature (barrel) | (° C.) | 210 |
| Zone 4 temperature (barrel) | (° C.) | 210 |
| Zone 5 temperature (neck) | (° C.) | 215 |
| Zone 6 temperature (neck) | (° C.) | 210 |
| Zone 7 temperature (body) | (° C.) | 215 |
| Zone 8 temperature (die holder) | (° C.) | 210 |
| Zone 8 temperature (die) | (° C.) | 220 |
| Head pressure | (bar) | 23 |
| Melt temperature | (° C.) | 257 |
| Screw speed | (rpm) | 15 |
| Extruder consumption | (A) | 33 |
| Extruder Voltage | (V) | 51 |
| Output | (Kg/h) | 8.2 |

At a given throughput of roughly 8 kg/h, composition of example 3b comprising a melt processable perfluoropolymer has shown a lower head pressure (23 bar) than a similar composition free from polymer (C) (see comparative example 1, table 2; pressure head of 28 bar at 8.3 kg/h of throughput).

The extruded pipe had a smooth surface, with no visible crack and/or surface defects. Mechanical properties have been evaluated on specimens usined from extruded pipes and measured according to ASTM D 638. Results are detailed in Table 6.

TABLE 6

| Thermoplastic fluoropolymer (A) | (per)fluoropolyether (B) | | melt-processible perfluoropolymer (C) | | Elastic modulus (MPa) | Stress at yield (MPa) | Strain at yield (%) | Stress at breack (MPa) | Strain at breack (%) |
|---|---|---|---|---|---|---|---|---|---|
| | nature | Amount | Nature | amount | | | | | |
| SOLEF® 6015 PVDF + SOLEF® 31515 PVDF (67/33 wt/wt) | See example 1 | 0.1% by weight of (A) | From example 2a) | 1.0% | 939 | 32.6 | 12.4 | 59.5 | 421 |

FIG. 1 is a SEM picture (magnification: 10 000×) of a specimen sampled from an extruded pipe of the thermoplastic composition of example 3b, after fragile rupture at liquid nitrogen temperature. White spots are phase separated domains of melt-processible perfluoropolymer (C).

Example 4

Preparation of a Melt-Processible Perfluoropolymer

A 22 l AISI 316 autoclave equipped with a stirrer working at 500 rpm was evacuated and there were introduced 14.5 l of demineralized water and 127 g of a microemulsion formed of:
20% by weight of GALDEN® D02, having the formula:

$CF_3O-(CF_2CF(CF_3)O)_m(CF_2O)_n-CF_3$ where m/n=20 and average molecular weight of 450;
30% by weight of a surfactant having the formula:

$Cl-(C_3F_6O)-(CF_2CF(CF_3)O)_{m1}-(CF(CF_3)O)_q-(CF_2O)_{n1}-CF_2COO^-NH_4^+$ where n1=1.0% m1, q=9.1% m1 and average molecular weight of 550; the remaining part being formed by $H_2O$.

The autoclave was put to vacuum and then heated to the reaction temperature of 75° C. Then ethane was charged as chain transfer agent with a delta pressure of 2.0 bar, perfluoromethoxyvinylether (PMVE) was charged with a delta pressure of 6.3 bar, and afterwards a TFE/PMVE mixture containing 13% by moles of PMVE was fed to obtain the reaction pressure of 21 absolute Bar.

The polymerization was initiated by introducing 315 ml of a ammonium persulfate (APS) solution, obtained by dissolving 14.5 g APS in 1 liter of demineralized water.

The reaction pressure was kept constant by feeding the monomer mixture TFE/PMVE containing 13% by moles of PMVE. After 290 minutes of reaction, the polymerization was stopped, cooling the reactor to room temperature and releasing the residual pressure.

A latex containing 329 (g polymer)/(kg latex) was discharged and coagulated with $HNO_3$, then the polymer was separated, washed with demineralized water and dried in an oven at 120° C. for about 16 hours.

The obtained powder has a dynamic viscosity of 5 Pa×s at 280° C. and at a shear rate of 1 $s^{-1}$, a $T_{m2}$ of 205.9° C., a $\Delta H_{2f}$=6.279 J/g and is composed of 13% by moles of PMVE and 87% by moles of TFE.

Example 5

Melt Compounding and Tape Extrusion of a Composition of a Thermoplastic Fluoropolymer, a Melt-Processable Fluoropolymer, and a (Per)Fluoropolyether A blend comprising a mixture of SOLEF® 6015 and SOLEF® 21216 VdF polymers (55/45 wt/wt), 1% by weight of the TFE/PMVE copolymer of example 12 and 0.3% by weight of a fluoropolyether complying with the following formula:

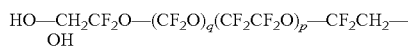

whose main physico-chemical properties are listed here below:

Speciments were machined out of the extruded tapes and submitted to $T_{db}$ measurement. The $T_{db}$ value obtained was 15° C.

Mechanical properties were evaluated on specimens of 0.4 mm obtained by compression moulding of the tapes above prepared and measured according to ASTM D 638.

Results are detailed in Table 9.

TABLE 9

| Thermoplastic fluoropolymer (A) | (per)fluoropolyether (B) | | melt-processible perfluoropolymer (C) | | Elastic modulus (MPa) | Stress at yield (MPa) | Strain at yield (%) | Stress at break (MPa) | Strain at break (%) |
|---|---|---|---|---|---|---|---|---|---|
| | nature | Amount | Nature | amount | | | | | |
| SOLEF ® 6015 PVDF + SOLEF ® 21216 PVDF (55/45 wt/wt) | See above | 0.3% by weight of (A) | From example 4 | 1.0% | 970 | 36 | 9 | 66.3 | 466 |

| | | |
|---|---|---|
| $M_w$ (amu) | | 2000 |
| Difunctional content (NMR) (%) | | 94 |
| p/q ratio (NMR) | | ~1 |
| Kinematic viscosity (cSt) | | 85 |
| Density at 20° C. (g/cm³) | | 1.81 |
| Vapor pressure @ 100° C. (torr) | | 2 × 10⁻⁵ |
| Surface tension @ 20° C. (dyne/cm) | | 24 | were mixed for 5 hours in a rotary blender and melt compounded in a Braebender conical twin-screw Hastelloy C-276 extruder having a final diameter of 18 mm. SOLEF® 6015 and SOLEF® 21216 VdF polymers are respectively a VdF homopolymer and a VdF/HFP copolymer, commercially available from Solvay Solexis S.p.A., having a MFI of roughly 0.2 g/10 min (230° C./5 kg). Temperature profile and extrusion parameters are detailed in Table 7.

TABLE 7

| Zone 1 temperature (hopper) | (° C.) | 200 |
|---|---|---|
| Zone 2 temperature (barrel) | (° C.) | 210 |
| Zone 3 temperature (barrel) | (° C.) | 220 |
| Zone 4 temperature (head) | (° C.) | 230 |
| Torque | (Nm) | 43 |
| Pressure | (bar) | 55 |
| Melt temperature | (° C.) | 231 |
| Throughput rate | (kg/h) | 4.2 |
| Screw speed | (rpm) | 15 |

The composition was then extruded to manufacture tapes of about 6 mm nominal thickness in the same extruder as above explained, equipped with an extruder head of 10 mm. The temperature profile and extrusion parameters are reported in the following Table 8.

TABLE 8

| Temp. 1 (° C.) | 200 |
|---|---|
| Temp. 2 (° C.) | 210 |
| Temp. 3 (° C.) | 220 |
| Temp. 4 (° C.) | 230 |
| Vacuum | No |
| rpm | 3 |
| Pressure (bar) | 0.2 (transducer calibrate at −0.7 bar) |
| Torque (Nm) | 15 |
| Output (kg/h) | 0.58 |
| Sheet drawing speed (m/min) | 0.1-0.2 |
| Sheet thickness (μm) | between 6200 and 6500 |
| Rolls Temp (° C.) | 140 |

Example 6

Melt Compounding and Tape Extrusion of a Composition of a Thermoplastic Fluoropolymer, a Melt-Processable Fluoropolymer, a (Per)Fluoropolyether and a Plasticizer Example 5 was repeated except that to the composition was added 2.5% weight of dibutylsebacate (DBS) (based on weight of thermoplastic fluoropolymer (A)). The thermoplastic composition was then extruded into pellets which were used for the manufacture of tapes of about 6 mm thickness. The temperature profile and extrusion parameters are reported in the following Table 10.

TABLE 10

| Temp. 1 (° C.) | 200 |
|---|---|
| Temp. 2 (° C.) | 210 |
| Temp. 3 (° C.) | 220 |
| Temp. 4 (° C.) | 230 |
| Vacuum | No |
| rpm | 4 |
| Pressure (bar) | 0.5 |
| Torque (Nm) | 11.3 |
| Output (kg/h) | 0.69 |
| Sheet drawing speed (m/min) | 0.2 |
| Sheet thickness (μm) | c.a. 6200 |
| Rolls Temp (° C.) | 140 |

Specimens were machined out of the extruded tapes and submitted to $T_{db}$ measurement. The $T_{db}$ value obtained was −10° C.

Mechanical properties were evaluated on specimens of 0.4 mm obtained by compression moulding from the tapes above prepared and measured according to ASTM D 638.

Results are detailed in Table 11.

TABLE 11

| Thermoplastic fluoropolymer (A) | (per)fluoropolyether (B) | | melt-processible perfluoropolymer (C) | | Elastic modulus (MPa) | Stress at yield (MPa) | Strain at yield (%) | Stress at breack | Strain at breack (MPa) | Plasticizer, DBS (%) |
|---|---|---|---|---|---|---|---|---|---|---|
| | nature | Amount | Nature | amount | | | | | | |
| SOLEF ® 6015 PVDF + SOLEF ® 21216 PVDF (55/45 wt/wt) | See above | 0.3% by weight of (A) | From example 4 | 1.0% | 820 | 31.9 | 13.9 | 70.9 | 513 | 2.5 |

It appears clearly from the above example that the composition containing the plasticizer has a lower $T_{db}$ and a high strain at yield respect to the composition without plasticizer. Both features are especially appreciated when the compositions are used for the manufacture of articles for oil and gas applications, in particular off-shore tubes and pipes.

The invention claimed is:

1. Thermoplastic halopolymer composition comprising:
   thermoplastic halopolymer, polymer (A), comprising: a mixture of:
     from 25% to 55% by weight of polymer (A) of at least one vinylidenefluoride (VdF) homopolymer, and
     from 45% to 75% by weight of polymer (A) of at least one VdF copolymer comprising from 0.1% to 15% by moles of a fluorinated comonomer selected from the group consisting of vinylfluoride ($VF_1$), chlorotrifluoroethylene (CTFE), hexafluoropropylene (HFP), tetrafluoroethylene (TFE), trifluoroethylene (TrFE), and mixtures thereof;
   from 0.01 to 5% by weight of polymer (A) of at least one (per)fluoropolyether, polymer (B); and
   from 0.3 to 10% by weight of polymer (A) of at least one per(halo)fluoropolymer, polymer (C).

2. The composition according to claim 1, wherein the (per)fluoropolyether comprises recurring units (R1) selected from the group consisting of:
   (I) —CFX—O—, wherein X is —F or —$CF_3$; and
   (II) —$CF_2$—CFX—O—, wherein X is —F or —$CF_3$; and
   (III) —$CF_2$—$CF_2$—$CF_2$—O—; and
   (IV) —$CF_2$—$CF_2$—$CF_2$—$CF_2$—O—; and
   (V) —$(CF_2)_j$—CFZ—O— wherein j is an integer from 0 to 3 and Z is a fluoropolyoxyalkene chain comprising from 1 to 20 recurring units chosen among the classes (I) to (IV) here above;
   and mixtures thereof.

3. The composition according to claim 2, wherein the (per)fluoropolyether is a compound complying with formula (I) here below:

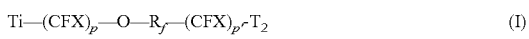
$$T_1—(CFX)_p—O—R_f—(CFX)_{p'}-T_2 \quad (I)$$

wherein:
each of X is independently F or $CF_3$;
p and p', equal or different each other, are integers from 0 to 3;
$R_f$ is a fluoropolyoxyalkene chain comprising repeating units $R°$, said repeating units being chosen among the group consisting of:
   (i) —CFXO—, wherein X is F or $CF_3$,
   (ii) —$CF_2$CFXO—, wherein X is F or $CF_3$,
   (iii) —$CF_2CF_2CF_2O$—,
   (iv) —$CF_2CF_2CF_2CF_2O$—,
   (v) —$(CF_2)_j$—CFZ-0- wherein j is an integer chosen from 0 and 1 and Z is a group of general formula -$OR_f'T_3$, wherein $R_f'$ is a fluoropolyoxyalkene chain comprising a number of repeating units from 0 to 10, said recurring units being selected from the group consisting of-—CFXO—, —$CF_2$CFXO—, —$CF_2CF_2CF_2$ 0-, —$CF_2CF_2CF_2CF_2O$—, with each of X being independently F or $CF_3$; and $T_3$ is a $C_1$-$C_3$ perfluoroalkyl group, and mixtures thereof;
$T_1$ and $T_2$, the same or different each other, are H, halogen atoms, $C_1$-$C_{30}$ end-group optionally comprising heteroatoms chosen among 0, S, N, and/or halogen atoms.

4. The composition according to claim 3, wherein the (per)fluoropolyether (B) is selected from the group consisting of:
   (a) HO—$CH_2CF_2O(CF_2O)_n(CF_2CF_2O)_mCF_2CH_2$-0H, m' and n' being integers, where the ratio m'/n' ranges between 0.1 and 10;
   (b) HO$(CH_2CH_2O)_nCH_2CF_2O(CF_2O)_n(CF_2CF_2O)_m$OH $F_2CH_2(OCH_2CH_2)_n$OH, m' and n' being integers, where the ratio m'/n' ranges between 0.1 and 10, and n ranges between 1 and 3;
   (c) $HCF_2O(CF_2O)_n$ $(CF_2CF_2O)_m$CF2H, m' and n' being integers, where the ratio m'/n' ranges between 0.1 and 10;
   (d) $FCF_2O(CF_2O)_n(CF_2CF_2O)_mCF_2F$, m' and n' being integers, where the ratio m'/n' generally ranges between 0.1 and 10.

5. Process for manufacturing the thermoplastic halopolymer composition according to claim 1, said process comprising mixing:
   (i) the thermoplastic halopolymer (A);
   (ii) the (per)fluoropolyether (B);
   (iii) the per(halo)fluoropolymer (C); and
   (iv) optionally, other additives or filling materials.

6. The process according to claim 5, said process comprising mixing by dry blending and/or melt compounding polymer (A), polymer (B) and polymer (C).

7. The process according to claim 6, said process comprising mixing the polymer (A) and the polymer (C) in the form of latexes.

8. The process according to claim 6, said process further comprising the step of mixing by synthesizing polymer (A) in the presence of polymer (C).

9. The process according to claim 5, said process comprising mixing polymer (C) in the form of particles having an average primary particle size of less than 300 nm.

10. Article comprising the thermoplastic halopolymer composition obtained by the process of claim 5.

11. Article comprising the thermoplastic halopolymer composition according to claim 1.

12. The composition according to claim 1, wherein the polymer (C) is selected from the group consisting of non-fibrillating PTFE and TFE copolymers comprising at least 2% wt, and at most 30% wt of recurring units derived from at least one fluorinated comonomer selected from the group consisting of:

(i) perfluoroalkylvinylethers complying with formula $CF_2=CFOR_{f1'}$, in which $R_{f1'}$ is a $C_1$-$C_6$ perfluoroalkyl, e.g. $CF_3$, $C_2F_5$, $C_3F_7$; and/or
(ii) perfluoro-oxyalkylvinylethers complying with formula $CF_2=CFOX_0$, in which $X_0$ is a $C_1$-$C_{12}$ perfluorooxyalkyl having one or more ether groups; and/or
(iii) $C_3$-$C_8$ perfluoroolefins.

13. The composition according to claim 12, wherein the non-fibrillating PTFE has a number average molecular weight of below 1,000,000 and a melt viscosity of below $10^4$ Pa·s, as measured at 372° C.

* * * * *